(12) United States Patent
Lee (10) Patent No.: US 7,770,193 B2
(45) Date of Patent: Aug. 3, 2010

(54) APPARATUS AND METHOD FOR CALCULATING AUDIENCE RATING USING INTERACTIVE TELEVISION

(75) Inventor: Jin Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1351 days.

(21) Appl. No.: 10/025,920

(22) Filed: Dec. 26, 2001

(65) Prior Publication Data

US 2002/0129360 A1 Sep. 12, 2002

(30) Foreign Application Priority Data

Dec. 29, 2000 (KR) .......................... 2000-0085755

(51) Int. Cl.
*H04H 60/32* (2008.01)
*H04H 60/33* (2008.01)

(52) U.S. Cl. .............................. 725/14; 725/9; 725/19; 725/20; 725/21

(58) Field of Classification Search ............... 725/9–21; 386/68
See application file for complete search history.

(56) References Cited

U.S. PATENT DOCUMENTS 5,416,693 A * 5/1995 Yoshinari ..................... 700/90
5,734,444 A 3/1998 Yoshinobu ................... 348/731
5,758,259 A 5/1998 Lawler ........................ 455/5.1
5,835,088 A 11/1998 Jaaskelainen, Jr. .......... 345/343
5,861,884 A 1/1999 Fujioka ....................... 345/338
6,184,918 B1 * 2/2001 Goldschmidt Iki et al. ..... 725/20
6,463,585 B1 * 10/2002 Hendricks et al. ............. 725/35
6,983,478 B1 * 1/2006 Grauch et al. ................. 725/13
7,003,790 B1 * 2/2006 Inoue et al. ................... 725/10
7,006,881 B1 * 2/2006 Hoffberg et al. .............. 700/83
2002/0056087 A1 * 5/2002 Berezowski et al. ........... 725/9
2003/0037333 A1 * 2/2003 Ghashghai et al. ............ 725/46

FOREIGN PATENT DOCUMENTS

WO WO97/471135 6/1997

* cited by examiner

*Primary Examiner*—John W Miller
*Assistant Examiner*—John Schnurr
(74) *Attorney, Agent, or Firm*—KED & Associates, LLP (57) ABSTRACT

The present invention discloses an apparatus and a method for calculating audience rating on a designated content based on user history record for an interactive television, in which the interactive television is able to provide user-oriented services by receiving the consumption type and the consumption behavior record information in the user history recorder of the interactive television; storing information on the user's action on the content and information on the content in the user history record; transferring the user record information to the content provider every designated cycle; and calculating the user's audience rating on each section in the designated content based on the analysis on the user record information.

12 Claims, 6 Drawing Sheets

```
<complexType name="RecordTransferHistory">
    <element name="Actiontime" type="mds: timePoint"
            minOccurs="0"/>
    <element name="Actionformat" type="mds: MediaFormat"
            minOccurs="0"/>
</complexType>
<complexType name="ConsumptionType">
    <element name="SimplyPlayed" type="mds: timePoint"
            minOccurence="0" maxOccurrence="unbounded"/>
    <element name="Recorded" type="mds: RecordorTransferHistory"
            minOccurence="0" maxOccurrence="unbounded"/>
    <element name="Backedup" type="mds: RecordorTransferHistory"
            minOccurence="0" maxOccurrence="unbounded"/>
    <element name="Transfered" type="mds: RecordorTransferHistory"
            minOccurence="0" maxOccurrence="unbounded"/>
    <element name="ReferenceTopProgram" type="mds: ReferenceTopProgram"
            minOccurs="1" />

</complexType>

<complexType name="COnsumptionBehavior">

<element name="NormalFinish" type="xml: boolean" minOccurs="0"/>
    <element name="Skimmed" type="mds: MediaTime"
            minOccurence="0" maxOccurrence="unbounded"/>
    <element name="Skipped" type="mds: MediaTime"
            minOccurence="0" maxOccurrence="unbounded"/>
    <element name="slowed" type="mds: MediaTime"
            minOccurence="0" maxOccurrence="unbounded"/>
    <element name="Replayed" type="mds: MediaTime"
            minOccurence="0" maxOccurrence="unbounded"/>
    <element name="Stopped" type="mds: MediaTimePoint"
            minOccurence="0"/>
    <element name="ReferenceTopProgram" type="mds: ReferenceTopProgram"
            minOccurence="1"/>
</complexType>

<complexType name="UsageHistory">
    <element name="ConsumptionType" type="mds: ConsumptionType"
            minOccurs="0" maxOccurrence="unbounded"/>
    <element name="ConsumptionType" type="mds: ConsumptionBehavior"
            minOccurs="0" maxOccurrence="unbounded"/>
</complexType>
```

APPARATUS AND METHOD FOR CALCULATING AUDIENCE RATING USING INTERACTIVE TELEVISION

BACKGROUND OF THE INVENTION

1. Field of the Invention

The present invention relates to an apparatus and a method for calculating audience rating. In particular, the present invention relates to an apparatus and a method for calculating audience rating using an interactive television.

2. Description of the Related Art

Recently, more people are using multimedia, and the industries concerned are more than willing to provide the user-oriented services to meet the user's needs. Among others, the service that is able to do self-observation of the user's consumption pattern to reflect his or her attractiveness has been drawing a lot of attention.

Many attempts have been made to provide help to the users. For example, U.S. Pat No. 5,861,884 disclosed a technique for providing an appropriate user interface to every user, taking advantage of his or her history that shows the favorite items of the user. In other words, comparing the help with a tree, although the original level might below or at the bottom, the user's favorite part can be put in a high level. In this way, the user can find his or her favorite part faster.

As another example, U.S. Pat. No. 5,835,088 suggested a new method for providing a more user-oriented interface by allowing the user to set functions for the buttons the way he or she wants.

Ever since the digital broadcasting was introduced, there has not been any time when additional functions in the broadcasting became a key factor in the broadcasting itself until now. For instance, a method for searching and displaying multimedia was suggested in which the information about the user's preference was extracted based on the user's consumption history information.

U.S. Pat. No. 5,416,693 laid open a more intelligent display method that records the user's display action, such as replay or fast forward, and later describes a user's attractiveness score according to the data segment. In other words, if the user tends to use the replay function more than any others, it is considered as a more important segment, and during the search, it enables a slow display function as well.

An International patent application No. WO9747135 once provided a method for providing a suitable environment for each user by recording device information, such as the user's favorite channel, the user's favorite sound magnitude on each channel and so on.

Further, U.S. Pat. No. 5,758,259 introduced a method providing a program guide based on the user's favorite program genres, instead of transmitting a vast amount of program guide as it is. The user's attractiveness on a certain genre can be figured out by recording the user's ordinary viewing data and extracting his or her habit out of the record.

Similarly, U.S. Pat. No. 5,734,444 introduced a recording system of the user's favorite programs automatically using the user's multimedia viewing history.

All of the functions described above are mostly accomplished based on the history record on the user's multimedia data consumption. That is to say, the attractiveness information is extracted from a numerical record of the user's multimedia data consumption, patterns or habits.

Unfortunately however, it has been rather difficult for a broadcasting station to calculate audience rating based on the information only. The bottom line is that the information provided by the traditional method for calculating the audience rating to the broadcasting company was no more than the data (i.e. contents) based on the consumption history information only, or the position information on the user's favorite contents. Namely, without other information about the user's contents consumption method, i.e., the Meta information on the corresponding contents, it is very hard to calculate the audience rating on a certain content more efficiently.

SUMMARY OF THE INVENTION

It is, therefore, an object of the present invention to provide an apparatus and a method for calculating audience rating using an interactive television, through which a broadcasting company can calculate the audience rating of a certain content per section by extracting a user's attractiveness to a designated section based on a consumption behavior record information written in a user history recorder inside of the interactive television.

To achieve the above object, there is provided an apparatus for calculating audience rating using an interactive television, the apparatus including: a content provider (e.g., a broadcasting company) equipped with an audience rating analyzer for transferring all kinds of contents including broadcasting programs, for analyzing a user record information transmitted from a receiver, and for calculating audience rating per section of a designated content; and an interactive television equipped with a controller for providing all kinds of contents provided by the content provider to a user, and for controlling interactive data transfer and audience rating calculation; a user history recorder for saving information on the user's action on a corresponding content under the control of the controller and information on the corresponding content in the form of user record information, wherein all the user record information saved in the user history recorder is transferred to the content provider every designated cycle.

Preferably, the audience rating analyzer in the content provider includes analytical tables for saving section information of a designated content per user. Once the user record information is transferred from the interactive television, the content's section where an action is made is first detected, and the frequency of the detected section saved in the analytical table is increased, which consequently enables to calculate the audience rating on the corresponding content's section.

The user history recorder preferably includes a consumption type recorder for saving information on how a user consumes a content, and a consumption behavior recorder for recording the consumption behavior of each section according to the user's action on each section while using a content.

The consumption type recorder preferably includes a simple view record area for recording relevant information and frequency thereof, in case a user views a content one time; a recording record area for recording relevant information and frequency thereof, in case the user records the content wishing to view the content again; a back-up saving record area for recording relevant information and frequency thereof, in case the content is saved in an external storage besides a receiver; at least one of transfer record areas for recording relevant information and frequency, in case the content is transferred to outside through network; and a storage record area for storing a content identifier to identify a relevant content.

The consumption behavior recorder preferably includes a normal finish record area for recording whether the user has view a content to the end at a normal speed; a skimmed record area for recording a section information on relevant action, in case the skimmed action is made on the content; a skipped record area for recording a section information on relevant action, in case the skipped action is made on the content, a replay record area for recording a section information on relevant action, in case the rewind action is made on the content; a slowed record area for recording a section information on relevant action, in case the slowed action is made on the content; at least one of stopped record areas for recording a section information on relevant action, in case the stopped action is made on the content; and a storage record area for storing a content identifier for identifying a relevant content.

Another aspect of the present invention provides a method for calculating audience rating using an interactive television, the method including:

(a) a first operating step of the interactive television that provides a user with all kinds of contents transferred from a content provider like a broadcasting company;

(b) a second operating step of the interactive television that stores consumption behavior record information including information on a user's action on a specific content and information on a relevant content in a user history recorder;

(c) a third operating step of the interactive television that transfers the consumption behavior record information stored in the user history recorder to the content provider every designated cycle; and (d) an operating step of a specific content provider that analyzes the consumption behavior record information transferred from the interactive television, and calculates audience rating per section of a designated content.

Upon receiving the user record information from the interactive television, the step (d) is particularly characterized of calculating the audience rating per section of the relevant content as the frequency of the action made in the relevant content increases.

More preferably, the step (d) further includes the steps of: designating a first consumption behavior record information among other consumption behavior record information currently being transferred from the interactive television as an object consumption behavior record information, and designating a first consumption behavior out of the designated object consumption behavior record information as a new action; detecting a content ID and a section of the content where the new action is generated, and increasing a frequency of the action of the detected section; repeating a procedure of designating the consumption behavior of the corresponding action as a new action if a next action exists in the object consumption behavior record information, a procedure of detecting a content ID and a section of the content where the new action is generated, and a procedure of increasing a frequency of an action on the detected section, until a next action does not exist any more in the object consumption behavior record information; and analyzing the entire content and attractiveness per section according to a user who is recorded in the object consumption behavior record information.

Further, the present invention provides the method for calculating audience rating using the interactive television includes the steps of: deciding a presence of a next consumption behavior record information among other consumption behavior record information transferred, given that a next action does not exist in the object consumption behavior record information; repeating a procedure of designating relevant consumption behavior record information as an object consumption behavior record information, and a procedure of increasing a frequency of a relevant action by finding a section on which the action is made until a next action does not exist any more in the designed object consumption behavior record information, given that the next consumption behavior record information exists; repeating the previous steps until a next consumption behavior record information does not exist among other transferred consumption behavior record information; and analyzing audience rating, if it is decided that the next consumption behavior record information does not exist, based on one of relevant content unit, time unit or section unit by using information on the content and information on frequency of an action on a certain section of the content.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore not to be considered limiting of its scope, the invention will be described with additional specificity and detail through use of the accompanying drawings in which:

FIG. 3 diagrammatically shows a structure of the user history recorder shown in FIG. 2 based on Extensible Markup Language (XML)

DETAILED DESCRIPTION OF THE PREFERRED EMBODIMENT

A preferred embodiment of the present invention will now be described with reference to the accompanying drawings. In the following description, same drawing reference numerals are used for the same elements even in different drawings. The matters defined in the description are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 1:
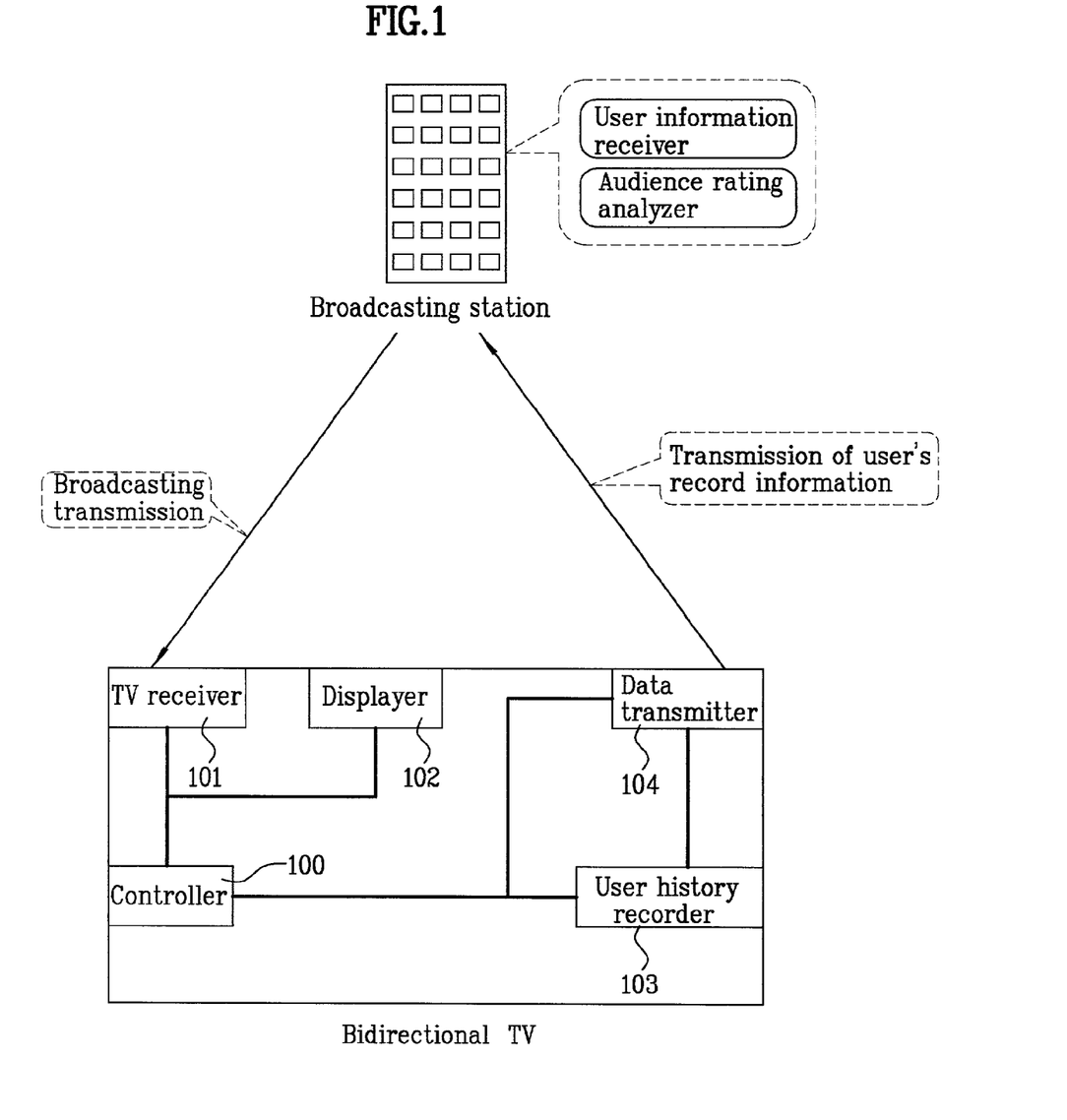
FIG. 1 is a conceptual diagram of an apparatus for calculating audience rating using an interactive television in accordance with the present invention.
Figure 2:
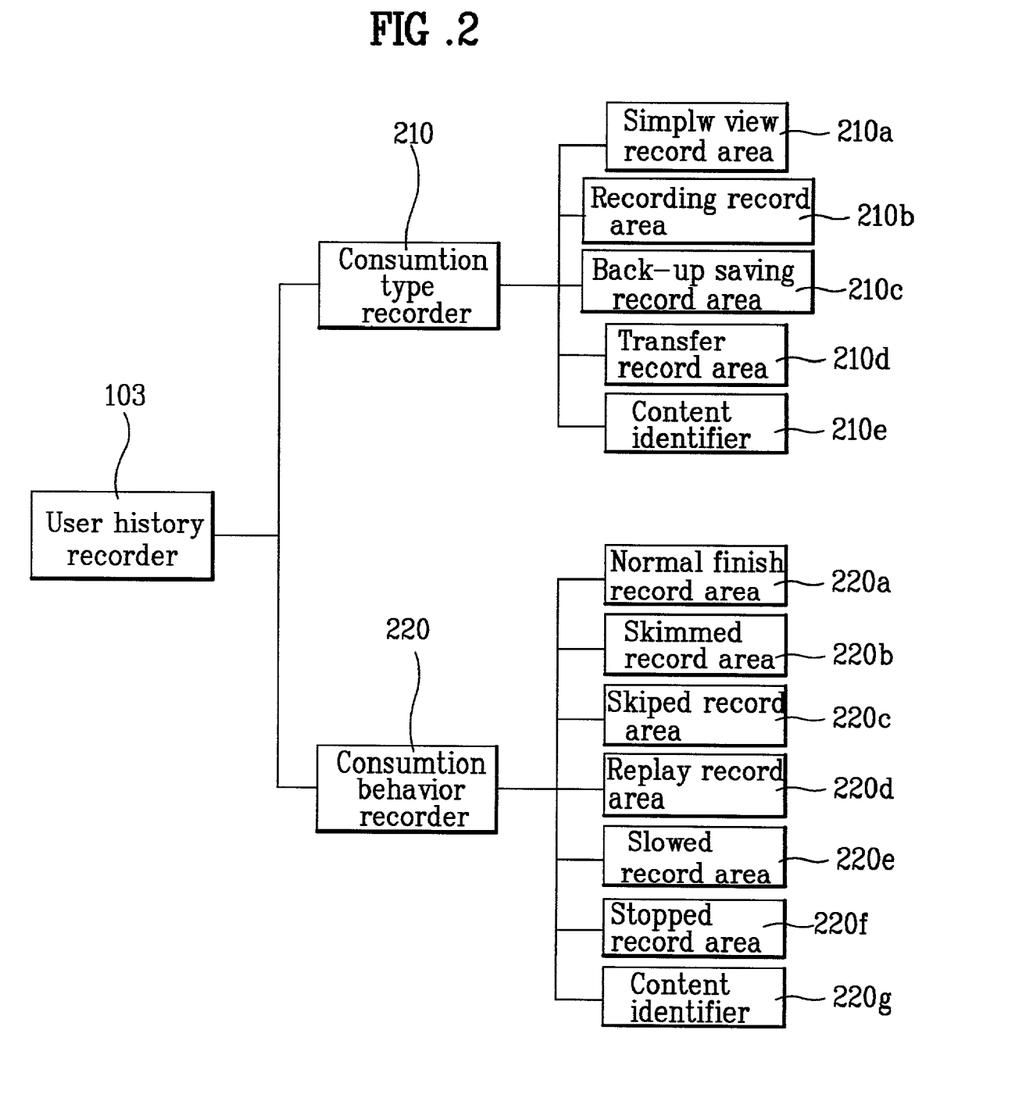
FIG. 2 is a structural diagram showing a user history recorder inside of the interactive television in accordance with the present invention.

FIG. 1 is a conceptual diagram of an apparatus for calculating audience rating using an interactive television in accordance with the present invention; FIG. 2 is a structural diagram showing a user history recorder inside of the interactive television in accordance with the present invention; and FIG. 3 is a diagram showing a structure of the user history recorder shown in FIG. 2 based on Extensible Markup Language (XML) First referring to FIG. 1, the apparatus for calculating the audience rating using the interactive television includes M (M is a natural number) broadcasting companies and N (N is a natural number) interactive televisions, where the broadcasting station can be either a content provider in general or any broadcasting station that provides multimedia contents like the television broadcasting programs and Meta information of relevant content.

The broadcasting company preferably includes a user record information receiver for receiving the user record information sent out by the interactive television, and an audience rating analyzer for calculating the audience rating based on the user record information.

The interactive television preferably includes a television receiver 101 for receiving contents provided by a broadcasting company; a controller 100 for controlling the entire interactive television, bi-directional data transfer, and audience rating; a displayer 102 for displaying a selected channel or a content, being controlled by the controller 100; a user history recorder 103 for storing a user's content consumption type per content and consumption behavior, being controlled by the controller 100; and a data transmitter 104 for transmitting the consumption type and the consumption behavior information recorded in the user history recorder 103 every cycle or upon a request of the broadcasting company.

The user history recorder 103 includes a consumption type recorder 210 for segmenting a user's consumption type on content and for saving the segmented behavior, and a consumption behavior recorder 220 for recording a user's consumption behavior on each section according to the user's action made on different sections while using content.

The preferable consumption type recorder 210 includes a simple view record area 210a for recording relevant information and frequency thereof, in case a user views a content one time; a recording record area 210b for recording relevant information and frequency thereof, in case the user records the content wishing to view the content again; a back-up saving record area 210c for recording relevant information and frequency thereof, in case the content is saved in an external storage besides a receiver; and at least one of transfer record areas 210d for recording relevant information and frequency, in case the content is transferred to outside through network.

More preferably, the consumption type recorder 210 further includes a content identifier record area 210e for recording the content identifier necessary to identify a relevant content.

The consumption behavior recorder 220 preferably includes a normal finish record area 220a for recording whether the user has viewed a content to the end at a normal speed; a skimmed record area 220b for recording a section information on a relevant action, in case the skimmed action is made on the content; a skipped record area 220c for recording a section information on a relevant action, in case the skipped action is made on the content; a replay record area 220d for recording a section information on a relevant action, in case the rewind action is made on the content; a slowed record area 220e for recording a section information on a relevant action, in case the slowed action is made on the content; at least one stopped record area 220f for recording a section information on a relevant action, in case the stopped action is made on the content.

More preferably, the consumption behavior recorder 220 further includes a storage record area 220g for storing a content identifier for identifying a relevant content.

That is, the consumption type recorder 210 and the consumption behavior recorder 220 in the user history recorder 103 have a separate content identifier 210e and 220g or a content reference, in order to manage the information on the consumption type and the consumption behavior that are grouped according to each content.

The content identifier used at this point is an identifier (ID) that is independent of a storage point of the content like a Digital Object ID (DOI) or a Content Reference ID of Content ID Forum (CIDF). In this way, it is accessible to the content any time, and to the Meta information related to the corresponding content. In consequence, even the Meta information not recorded in the user history recorder 103 can be obtained from other external or internal storage, if it is necessary for extracting the user's attractiveness.

On the other hand, the user history recorder 103 can be a portable recorder like a smart card, or a recorder like a hard disc (HDD) equipped in the interactive television.

Figure 4:
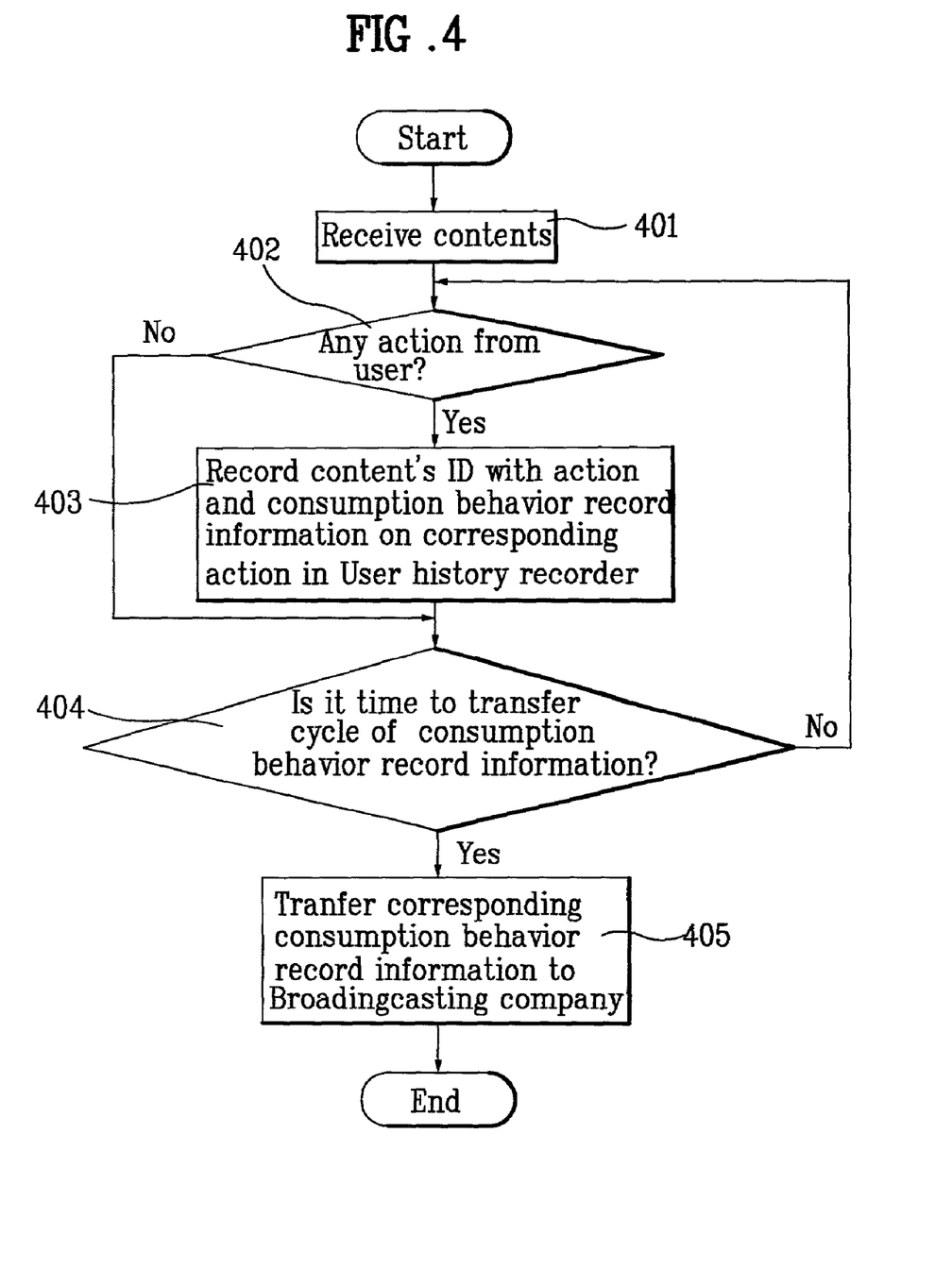
FIG. 4 and FIG. 5A, 5B are flow charts showing a method for calculating audience rating using the interactive television in accordance with a preferred embodiment of the present invention.
Figure 5A:
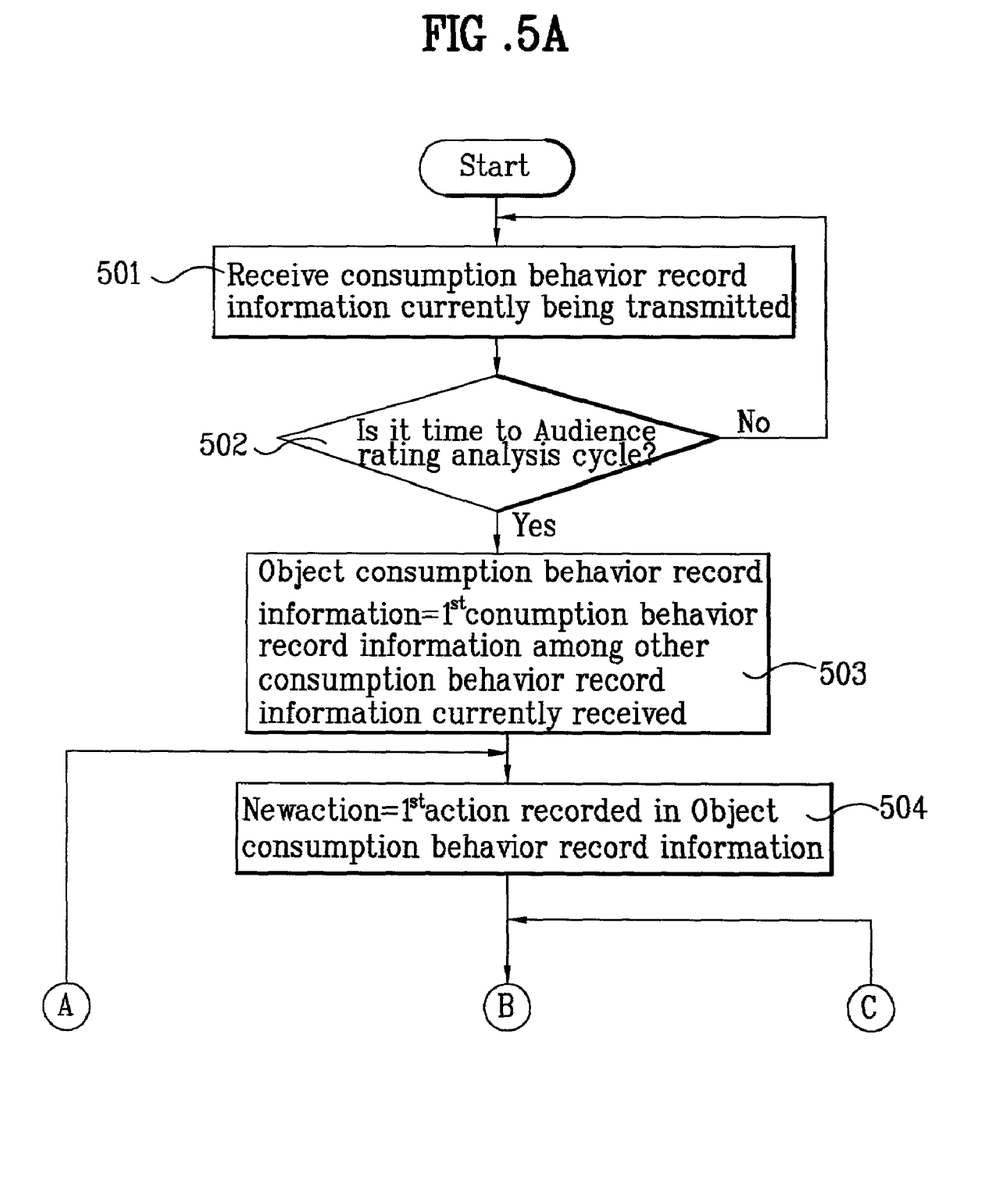
Figure 5B:
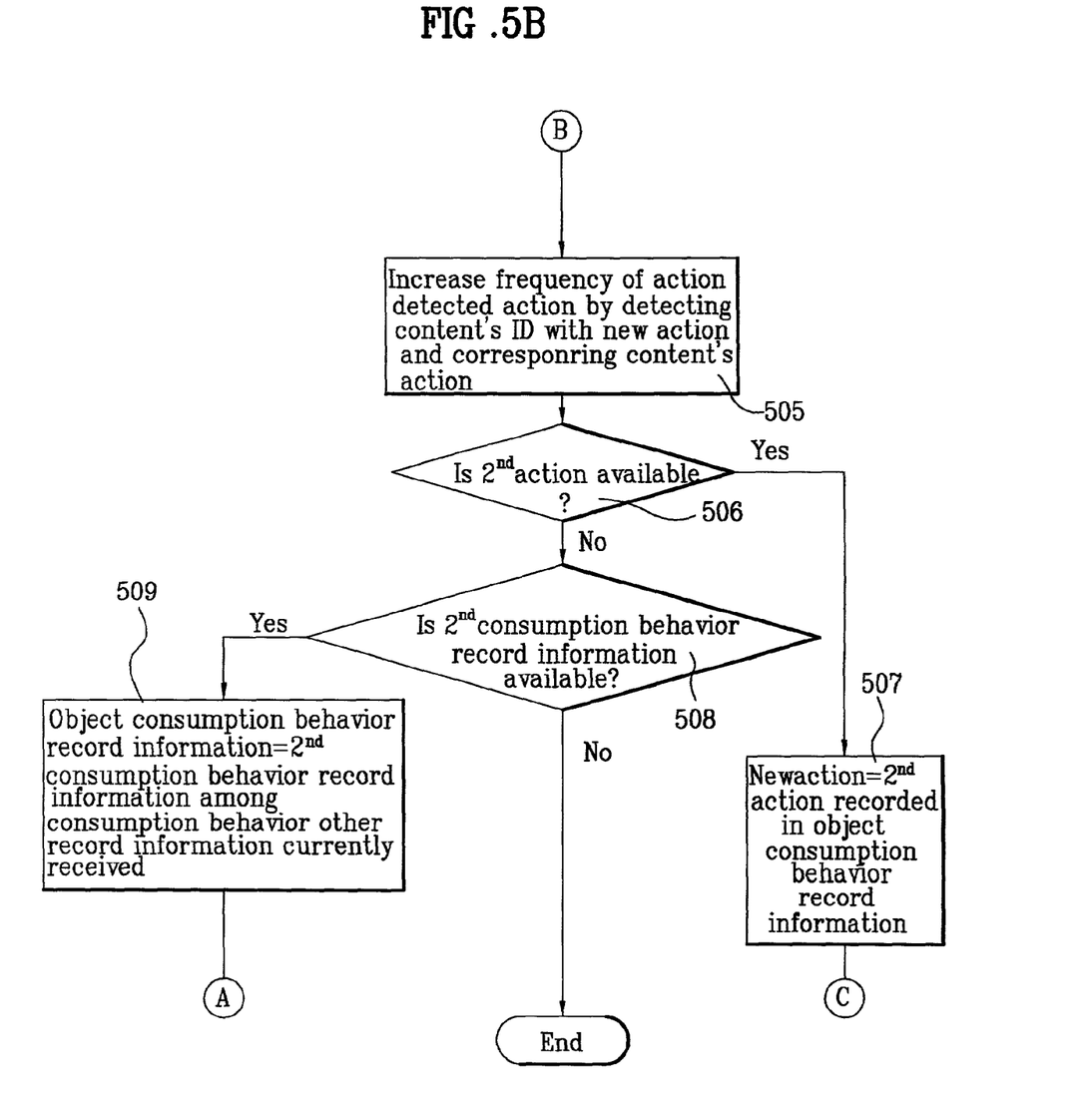

FIG. 4, 5 are flow charts illustrating the method for calculating audience rating using the interactive television according to the present invention. Specifically, FIG. 4 is a flow chart explaining the operation performed by the interactive television for calculating the audience rating, and FIG. 5A,5B are flow charts explaining the operation performed by the broadcasting company for calculating the audience rating.

Especially the relevant part with calculation of the audience rating is explicitly explained with reference to FIGS. 1 through 4.

First of all, the interactive television receives the designated content and the Meta information transmitted from the broadcasting company, and saves the user's action on the designated content received and the corresponding content ID in the user history recorder 103. In addition, the interactive television sends out the user record information recorded in the user history recorder 103 (i.e., the consumption type record information and the consumption behavior record information) to the broadcasting company.

In short, the interactive television receives the designated content from the broadcasting company (step 401).

Then, it is decided whether the user generates a designated action on the received content (step 402). In other words, it is decided whether the user takes the action he or she wants on the received content.

In result of the decision (step 402), if there is the designated action on the received content by the user, the content's ID with the corresponding action and the consumption behavior record information about the action are recorded in the consumption behavior recorder 220 of the user history recorder 103 inside of the interactive television (step 403).

The user may take any action out of the consumption behaviors, for example, 'normal finish', 'skimmed', 'skipped', 'replay', 'slowed', or 'stopped'. If the user takes any one of the listed actions, the information of the corresponding consumption behavior is recorded in the consumption behavior recorder 220.

The normal finish behavior is flag information indicating whether the user watched a content from the beginning to the end at a normal speed. And, if the normal finish action is generated on the content, 1 or a true value is recorded in the normal finish record area 220a of the consumption behavior recorder 220.

The skimmed behavior indicates the information that is generated when the user takes the skimmed action during watching a content. Once the skimmed action is generated on the content, the section information of the content with the corresponding action is recorded in the skimmed record area 220b of the consumption behavior recorder 220.

The skipped behavior indicates the information that is generated when the user takes the skipped action during watching a content, a new section the user actually has not watched appears. When the skipped action is generated on the content, the section information of the content with the corresponding action is recorded in the skipped record area 220c of the consumption behavior recorder 220.

The replay behavior indicates the information that is generated when the user takes rewind action on a content, thereby replaying the content several times. When the replay action is generated on the content, the section information of the content with the corresponding action is recorded in the replay record area 220d of the consumption behavior recorder 220.

The slowed behavior indicates the information that is generated when the user takes the slowed action during watching the content at a slower speed than the normal. When the slowed action is generated on the content, the section information of the content with the corresponding action is recorded in the slowed record area 220e of the consumption behavior recorder 220.

Finally, the stopped behavior indicates the information that is generated when the user takes the stopped action in the middle of the content, without finishing the content to the end. When the stopped action is generated on the content, the section information of the content with the corresponding action is recorded in the stopped record area 220f of the consumption behavior recorder 220.

At this point, if the user replays a part after the stopped point from the replay point, the previous stopped record is automatically deleted. In addition, if the user stops at another different point after the replay, the corresponding stopped point is again recorded. Further, in case that the user watches the corresponding content to the end, it is not regarded as the stopped record, but as the normal finish behavior. In this case, it is recorded in the normal finish record area 220a, and the relevant stopped record is deleted.

Therefore, it is known whether the user already viewed the content or not by looking at the normal finish record area 220a. Moreover, the content's section recorded in the skimmed record area 220b and the skipped record area 220c are regarded as a less interesting section to the user in the relevant content, and can be used for extracting negative attractiveness through the Meta information on the corresponding section.

In contrast, the content's section recorded in the replay record area 220d and the slowed record area 220e are regarded an interesting section to the user in the designated content, and can be used for extracting positive attractiveness through the Meta information on the corresponding section.

Meanwhile, the consumption behaviors recorded in the consumption behavior recorder 220, such as skimmed, skipped, replay, and slowed, can be manifested to each section of the corresponding content with a relevant action, respectively. For instance, the section information having the relevant action generated can be indicated as the information notifying the start and the end of the section, or the information expressing the start of the section as well as the length of the section. Also, the stopped behavior, if the user stops watching in the middle of the content, records the latest stopped point, and can use a point indicator for indicating the corresponding part of the content.

The Table 1 below illustrates an example of data format that is recorded in the consumption behavior recorder 220, that is, the normal finish record area 220a, the skimmed record area 220b, the skipped record area 220c, the replay record area 220d, the slowed record area 220e, and the stopped record area 220f, respectively.

TABLE 1

| Consumption Behavior Recorder | Recording System of Consumption Frequency |
| --- | --- |
| Normal finish record | Flag value (0/1) |
| Skimmed record | Section start/end or Section start/length |
| Skipped record | Section start/end or Section start/length |
| Replay record | Section start/end or Section start/length |
| Slowed record | Section start/end or Section start/length |
| Stopped record | Stop point indicator |

Especially some areas of the consumption behavior recorder 220, including the skimmed record area 220b, the skipped record area 220c, the replay record area 220d, and the slowed record area 220e further include an area for saving the frequency of an action per section. This means that whenever any action out of the skimmed, the skipped, the replay, and the slowed is taken, the frequency of the corresponding action of the section where the action belongs increases.

The stopped record, on the other hand, records the information on the latest stop point, especially when the user stops using the relevant content in the middle, thereby increasing the consumption frequency of the stopped behavior.

In the meantime, how the relevant content has been used (or consumed) is recorded in the consumption type recorder 210. In fact, the information on the consumption frequency of the simple view record area 210a, the recording record area 210b, the backup record area 210c, and the transfer record area 210d in the consumption type recorder 210 increases every time of viewing, recording, back-up saving and transferring.

The simple view record area 210a is a place where the actual finish time of viewing or the actual start time of watching per simple view of the relevant content is saved. And, in the recording record area 210b, the back-up saving record area 210c, and the transfer record area 210d, respectively, the time for performing recording/back-up/transfer (the actual time of start or finish), the information on recording/back-up/transfer format, and the parameters required for defining recording/back-up/transfer format can be saved.

At this time, each broadcasting company, if possible, can analyze an interesting section and a less interesting section to the user on a content, or extract the user's attractiveness, given that the broadcasting company has every consumption type and consumption behavior recorded in the user history recorder 103. Also, the broadcasting company can calculate the audience rating on the content as well.

The data transmitter 104 decides whether it is time for a transfer cycle for the consumption type and the consumption behavior record information recorded in the user history recorder 103 (step 404).

In result of the decision (step 404), if it is the transfer cycle for the user record information, all corresponding consumption type and the consumption behavior record information in the user history recorder 103 are transferred to the broadcasting company (step 405).

Here, the transfer of the user record information can be done not only every designated cycle, but also upon the request of the broadcasting company. In addition, the transfer itself can be varied depending on the designer.

FIGS. 5A, 5B are flow charts illustrating of the operation performed by a broadcasting company to calculate audience rating. To this end, the broadcasting company receives the consumption type and the consumption behavior record information from the interactive television for calculating the audience rating per section of the designated content.

According to the present invention, each broadcasting company is supposed to calculate the audience rating based on the consumption type and the consumption behavior record information recorded in the user history recorder 103. Here, an embodiment of the present invention particularly explains the calculation of the audience rating using the information recorded in the consumption behavior recorder 220.

First of all, the broadcasting company receives the designated consumption behavior record information from the interactive television (step 501).

The broadcasting company also decided whether it is time for the analytical cycle of the designated attractiveness (step 502).

In result of the decision (step 502), if it became the analytical cycle for the designated attractiveness, the first consumption behavior record information out of the consumption behavior record information currently being received is designated as the object consumption behavior record information, (step 503).

And, the first consumption behavior that is generated in the object consumption behavior record information is initialized as a new action (step 504), where the new action is a sort of variable.

For example, suppose that the consumption behavior record information has been transferred in order of what is shown in FIG. 2, and that the skipped and the replay actions are generated in the relevant consumption behavior record information, the skipped action is designated as the new action.

Next, the ID of the content and the section of the content where the new action is generated are detected, and the frequency of the corresponding action increases in the detected section (step 505).

Further, it is decided whether the second action is recorded in the object consumption behavior record information (step 506).

In result of the decision (step 506), if the second action is duly recorded in the object consumption behavior record information, the second action recorded in the relevant object consumption behavior record information is designated as a new action (step 507). In the previous case, for example, the replay action becomes designated as the new action.

Once the new action is designated in the step 507, the step 505 is again proceeded to detect the ID and the section of the content where the new action is generated, and the frequency of the corresponding action increases in the detected section. Then, it is again decided whether a next action exists or not.

In short, if the next actions, besides the first and the second actions, are sequentially recorded in the object consumption behavior record information as aforementioned, the procedures for increasing the frequency of the action in the relevant section is repeatedly conducted.

In other words, if an action occurs in the designated content, the analytical table can be drawn out based on the section and the ID of the content where the subject action is generated, and on the frequency of the action generated in the same section, which consequently are used for calculating the audience rating of different sections of the relevant content. Furthermore, it is also possible to find out which section has comparatively high attractiveness to the user.

Table 2 is an example of the analytical table illustrating the content ID, the frequency of the action (e.g., normal finish, skimmed, skipped, replay etc) generated on the relevant content, and the content's section.

tion can be relative time information of the content, and the frequency described under the content ID indicates how many times each action is generated against the entire content.

In addition, the section division information can be manifested in the form of frame information or absolute time information.

If the user took the designated action on a single section, it is recorded as if the user's action would have been occurred to the action of the entire content. For example, if the replay action is taken in the section 3 and the section 5, it is recorded that the replay action took place in the action of the entire content.

Therefore, the audience rating on different section of the relevant content can be calculated by drawing out the analytical table on each content, as shown in FIG. 2.

Taking news as an example, an article can be a section in this case. Thus it is also possible to calculate the audience rating on the basis of each article unit.

On the other hand, the analytical table on the designated content as shown in FIG. 2 does not have to be drawn all the time. Instead, the analytical table can be optionally expanded or reduced, such as formatting the analytical table for the entire content only.

For example, using the analytical table based on the first consumption behavior record information, the audience rating per content for each user recorded in the first consumption behavior record information, and the audience rating per section in the content can be calculated. In addition, the user's channel attractiveness on the hourly basis can be calculated too.

Next, in result of the decision (step 506), if the second action is not recorded in the object consumption behavior record information, it is decided whether the second consumption behavior record information exists among the consumption behavior record information currently being received (step 508).

If it turns out that the second consumption behavior record information is included in the consumption behavior record information currently being received, the second consumption behavior record information is designated as the object consumption behavior record information (step 509), and the step 504 proceeds. That is, in the step 504, the first action recorded in the corresponding object consumption behavior record information is designated as the new action, and in the step 505, the frequency of the action of the relevant section is increased. These procedures are repeated until the next action does not exist.

TABLE 2

| | Content ID =:10899TX | Section 1 | Section 2 | Section 3 | Section 4 | Section 5 |
|---|---|---|---|---|---|---|
| Section division | 1~50 | 1~13 | 13~21 | 2~39 | 39~45 | 45~50 |
| Normal finish record | 109 | 109 | 109 | 109 | 70 | 50 |
| Skimmed record | 0 | 0 | 0 | 0 | 0 | 0 |
| Skipped record | 0 | 0 | 0 | 0 | 0 | 0 |
| Replay record | 8 | 1 | 5 | 7 | 3 | 2 |

The section division information in the Table indicates to which part of the entire content each section of the relevant content belongs. At this point, the section division informa- Also, if the next action does not exist, it is decided whether another next consumption behavior record information exists in the consumption behavior record information currently being received, and if there is, the above described procedures, the step 504 and the step 505, are repeated.

For instance, similar to the procedure performed on the first consumption behavior record information, if even the second consumption behavior record information exists in the consumption behavior record information currently being received, the analytical table based on each action and its content section recorded in the relevant second consumption behavior record information can be made out.

Again, the user's attractiveness for different sections can be calculated using the analytical table prepared based on each consumption behavior record information unit. Moreover, if the analytical table is combined all together, the audience rating per content, and section in the content can be calculated. In case that the user record information includes age, address, or sex, it is also possible to make analysis based on age, area and sex. In other words, the audience rating categorized by age, area or sex can be calculated on the relevant content or the content's section.

As explained so far, the present invention enables the broadcasting company to extract every user's attractiveness to each section of the relevant content based on the information of the user's action on the designated content. Also, the broadcasting company can provide the services the user wants by calculating the user's audience rating on content or section in the content.

Not only that, the present invention makes it possible to calculate the audient rating on the relevant content based on the consumption type record information, such as simple view, recording, back-up saving, or transfer information.

The method for calculating the audience rating of the present invention using the consumption type record information and the consumption behavior record information recorded in the user history recorder can be applied to various fields as well.

In conclusion, the method for calculating the audience rating using the interactive television is very advantageous in that the user can get the services he or she wants from the broadcasting company who receives the consumption type and the consumption behavior record information in the user history recorder of the interactive television, and calculates the user's audience rating on each section in the designated content by analyzing the user record information.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. An apparatus for calculating an audience rating using an interactive television, the apparatus comprising:
    a receiver for receiving contents;
    a controller for providing contents to a user and for controlling interactive data transfer;
    a user history recorder for saving information on a user's action on a corresponding content under control of the controller, the user history recorder including a consumption type recorder for segmenting a user's consumption type on content and for saving the segmented behavior, and a consumption behavior recorder for recording a user's consumption behavior on each section according to the user's action made on different sections while using content; and
    a data transmitter for transmitting at least one of the consumption type and the consumption behavior information recorded in the user history recorder every cycle or upon a requesting,
    wherein the consumption type recorder comprises:
        a recording record area for recording relevant information and frequency thereof regarding when the user records the content, and
        a back-up saving record area for recording relevant information and frequency thereof regarding when the content is saved in an external storage besides a receiver, and wherein the consumption behavior recorder comprises:
        a normal finish record area for recording information regarding whether the user has viewed the entire content to an end at a normal speed,
        a stopped record area for recording section information regarding a stopped action made by the user during a middle of the content, the section information regarding the stopped action including a stop point indicator relative to the content,
        a skimmed record area for recording section information regarding a skimmed action made on the content, and
        a skipped record area for recording section information regarding a skipped action made on the content, wherein the stopped action, the skimmed action and the skipped action are each different actions; and
    wherein the information from the normal finish record area, the section information from the stopped record area, the section information from the skimmed record area and the section information from the skipped record area are transferred by the data transmitter,
    wherein the normal finish record area stores a flag value indicating whether a user watched a content from a beginning to an end at a normal speed, and a frequency of the normal finish action based on the flag value,
    the stopped record area stores a stop point indicator indicating a latest stopped point in the middle of the content, and a frequency of the stopped action based on the stop point indicator,
    the skimmed record area stores a section start/end information or a section start/length information relating to a section having the skimmed action, and a frequency of the skimmed action based on the section start/end information or the section start/length information, and
    the skipped record area stores a section start/end information or a section start/length information relating to a section having the skipped action, and a frequency of the skipped action based on the section start/end information or the section start/length information,
    wherein the normal finish record area, the stopped record area, the skimmed record area and the skipped record area include an area for storing the frequency of an action per section.

2. The apparatus of claim 1, wherein the user history recorder is a portable recorder like a smart card.

3. The apparatus of claim 1, wherein the user history recorder is installed in the interactive television receiver.

4. The apparatus of claim 1, wherein the consumption type recorder further comprises:
    a simple view record area for recording relevant information and frequency thereof regarding when a user views the content; and
    at least one transfer record area for recording relevant information and frequency regarding when the content is transferred externally through a network.

5. The apparatus of claim 1, wherein the consumption behavior recorder further comprises:
- a replay record area for recording section information regarding when a rewind action is made on the content; and
- a slowed record area for recording section information regarding when a slowed action is made on the content, wherein the stopped action, the skimmed action, the skipped action, the rewind action and the slowed action are each different actions.

6. The apparatus of claim 5, wherein when the user views again the designated content the user stopped viewing before, all previous stopped record information is deleted, and a latest stopped point information is again recorded in the stopped record area.

7. The apparatus of claim 5, wherein the information recorded in the skimmed record area and the skipped record area is designated as record information with low attractiveness to a section of a designated content, while the information recorded in the replay record area and the slowed record area is designated as record information with high attractiveness to a section of the designated content.

8. The apparatus of claim 1, wherein when the user replays a designated content at an ending part of the designated content, the action is recorded in the normal finish record area.

9. The apparatus of claim 1, wherein user record information recorded in the user history recorder is transferred to a content provider if the content provider request the user record information.

10. The apparatus of claim 1, wherein the skimmed record area stores information identifying a start and an end of the skimmed action.

11. The apparatus of claim 1, wherein the skimmed record area stores information identifying a start and a length of the skimmed action.

12. The apparatus of claim 1, wherein the skipped record area stores information identifying a start and one of an end skipped action or a length of the skipped action.

* * * * *